Oct. 31, 1961     P. G. MUELLER     3,006,478
STRAINER
Filed Nov. 19, 1956
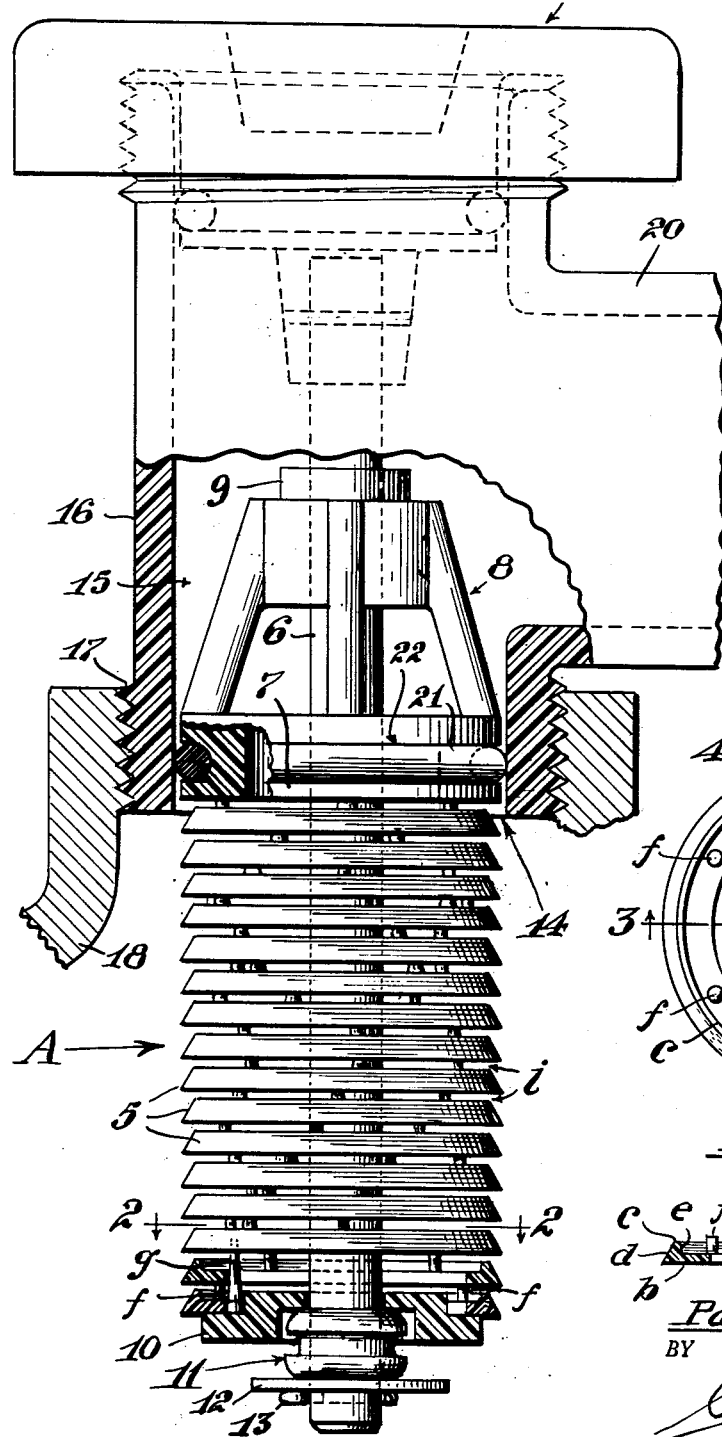
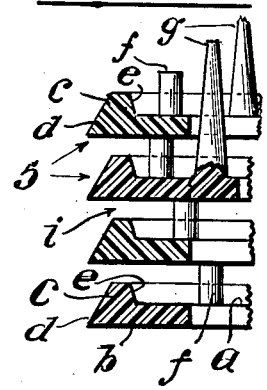
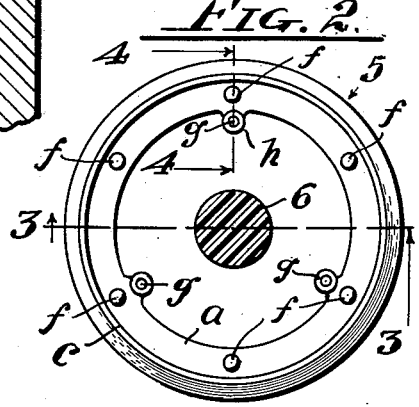
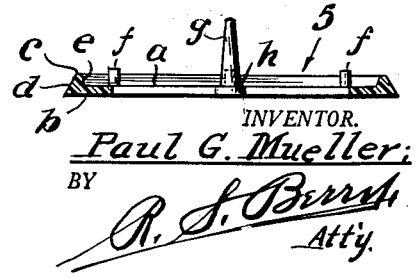
INVENTOR.
Paul G. Mueller;
BY
R. S. Berry
Atty.

3,006,478
STRAINER
Paul G. Mueller, 330 S. La Peer Drive,
Los Angeles, Calif.
Filed Nov. 19, 1956, Ser. No. 623,097
5 Claims. (Cl. 210—356)

This invention relates to a screen for application to a reservoir outlet to prevent discharge of a granular content of the reservoir while permitting flow of liquid therefrom.

An object of the invention is to provide a device of the above character which is especially applicable for use as a screen for the throat of the combined intake and discharge passage of the reconditioning tank of a water softening apparatus, wherein the tank contains a quantity of granular filtering material together with a mass of zeolite particles through which a flow of water is passed in one direction in effecting a water softening action and through which is subsequently passed in the opposite direction a quantity of brine and backwash water to effect cleansing of the filtering material and reconditioning of the zeolite, which latter liquids flow upwardly through the filtering of the zeolite mass and pass to discharge through the passage which is located in the upper end of the tank. Various screens have heretofore been employed for the purpose of preventing discharge of the granular materials from such tanks during the washing reconditioning operations, and particularly that of the zeolite, since this material is somewhat buoyant and in the absence of a screen would be carried at least in part to discharge together with the liquid flowing from the tank. Such screens as ordinarily constructed are subject to corrosion and the accumulation of scale and also to become clogged with the granular materials, and accordingly require occasional renewal and also have to be removed and replaced from time to time for cleaning purposes. Furthermore such screens are ordinarily provided with screening orifices of fixed dimensions which when clogged are difficult to clear.

A particular object of the invention is to provide a screen for the purpose specified which is so formed that it may be readily constructed of non corrodable material and wherein the screening orifices are subject to being expanded under the urge of liquid flowing therethrough in a reverse direction, that is from the side thereof opposite its clogged side, so as to render the screen self cleaning on reversing the direction of liquid therethrough.

A further object is to provide a screen which embodies in its ensemble a plurality of complementary annular screen elements adapted to be superimposed or stacked in detached relation to each other on a support with adjacent elements spaced apart to form passages for fluid therebetween, in which means are provided on the several elements for effecting their spacing relative to each other together with means for substantially axially aligning a multiple of the stacked elements and also to provide a construction whereby the elements may be slightly spread apart and in some instances shifted laterally relative to each other under the urge of a stream of liquid directed from the interior of the assembly of elements to the exterior thereof.

With the foregoing objects in view together with such other objects and advantages as may subsequently appear, the invention resides in the parts and in the combination, construction and arrangement of parts hereinafter described and claimed, and as illustrated by way of example in the accompanying drawing in which:

FIG. 1 is a view in elevation of the screen with parts shown in section and illustrating it as applied to the combined intake and discharge passage of a tank;

FIG. 2 is a view in horizontal section taken on the line 2—2 of FIG. 1 showing one of the annular screen elements in plan;

FIG. 3 is a view in transverse section taken on the line 3—3 of FIG. 2 showing the screen element as detached; and FIG. 4 is an enlarged detail in section taken on the line 4—4 of FIG. 2 showing the manner of assembling a multiple of the screen elements in superimposed spaced and laterally movable relative to each other.

Referring to the drawings more specifically A indicates generally the screen proper which is in the form of a hollow cylinder and embodies a stack of superimposed spaced apart annular screening elements 5 and which elements are complementary and are constructed as particularly shown in FIGS. 2, 3 and 4. Each of the elements 5 comprises an annulus or ring having flat upper and lower faces $a$ and $b$ respectively and formed with an upstanding narrow marginal flange $c$ having beveled outer and inner side faces $d$ and $e$ respectively, the outer face $d$ inclining inwardly from its lower margin and the inner face $e$ inclining outwardly from its lower margin.

Projecting upwardly from the upper face $a$ in spaced relation to the flange $c$ is a series of spacing studs $f$ which extend above the upper edge of the flange $c$, the upper ends of which studs serve as seats for the corresponding element 5 positioned thereabove and also serve to space adjacent elements 5 apart as shown in FIG. 4. The studs $f$ are pin-like in form and have a diameter approximating the thickness of the narrow flange $c$.

As a means for substantially axially aligning superimposed elements 5 relative to each other, each of the elements is formed with a series of at least three upstanding tapered pins $g$ carried on bosses $h$ projecting inwardly from the inner margin of the element 5 as particularly shown in FIG. 2, which pins extend above the upper ends of the studs $f$ so as to project interiorly of one or more of the superimposed elements 5 as shown in FIG. 4. The pins $g$ are tapered so that they will be normally spaced a slight distance from the inner periphery of an adjacent element 5 so as to permit slight lateral movement of adjacent elements 5 relative to each other although retaining the stacked assemblage of elements 5 at least nearly or substantially in axial alignment. The pins $g$ also serve to permit movement of adjacent of the elements 5 away from each other a considerable distance without coming apart.

The spacing studs $f$ are spaced inwardly from the flange $c$ so as to afford no obstruction in the slot $i$ extending between the upper edge of the flange $c$ and the underside of the adjacent element 5, the space $i$ constituting a screening orifice or slot which extends completely around the cylindrical screen.

The tapered faces $d$ and $e$ of the flange $c$ imparts to the slots $i$, a venturi like effect greatly reducing the resistance to flow of liquid inwardly and outwardly through the slots and thereby reducing the pressure loss through the screen and permitting the use of a smaller screen.

In forcing the screen A, a stack of the elements 5 are mounted on a stem 6 which extends axially of the assemblage of elements 5 in spaced relation to the inner margins of the latter, which stem is fitted intermediate its ends with an abutment 7 against which the uppermost of the elements 5 abuts. The abutment 7 comprises an annulus which encircles the stem 6 in spaced relation thereto and is carried on a spider 8 abutting a collar 9 affixed to the stem 6. Loosely mounted on the lower end of the stem 6 and abutting against the lowermost of the elements 5 is a washer 10 against the underside of which thrusts a resilient grommet 11 seated on a washer 12 held in place on the stem 6 by a plastic pin 13. The grommet 11 is tensioned to yieldably normally maintain the assembly of the elements 5 with adjacent elements in sliding abutting relation to each other yet yield to permit spreading or moving apart of the elements under the thrust of the stream of liquid flowing through the slots *i* particularly from the interior of the screen.

In assembling the elements 5 in a stack of the adjacent elements are necessarily arranged with the pins *g* thereof disposed in spaced offset relation to each other since their upper ends must overlie the inner periphery of the superimposed element at either side of the bosses *h*. The adjacent elements 5 being unattached with the superimposed elements freely seated on the subjacent elements permits of their being readily assembled in a loose stack.

In the application of the invention the screen A is positioned to extend into a tank or reservoir from the throat 14 of the liquid passageway 15 of a coupling 16 screwed into the mouth of an opening 17 in the upper end portion 18 of a tank as shown for example in FIG. 1; the stem 6 being carried on and depending axially from a closure cap 19 screwed on the open upper end of the coupling 16. The passage 15 of the coupling leads through a lateral extension 20 on the latter and connects with a suitable valve structure, not shown, controlling the intake and discharge of fluid to and from the tank.

In the application of the invention the screen constitutes in its entirety a hollow cylinder formed with a series of parallel open slots extending circumferentially around its entire perimeter and when applied as shown in FIG. 1, the open upper end of the screen cylinder is presented to the passage 15. As a means for sealing the passage 15 around the exterior of the screen A the abutment ring 7 is positioned within the lower end of the coupling 16 and is fitted with a resilient sealing ring 21 seated in a peripheral channel 22 on the abutment ring 7 which sealing ring snugly abuts the inner periphery of the lower end portion of the coupling 16. The stack of elements 5 and the abutment ring 7 have diameters less than that of the passageway 15 whereby the screen A is insertable and removable through the coupling 16, the screen being inserted in the upper end of the passageway and advanced therein to near its assembled position where the closure cap 19 is engaged with the upper end of the coupling and is screwed thereon to thereby advance the screen and its abutment ring to the assembled position shown in FIG. 1. On unscrewing the cap 19 from the coupling 16 the screen A carried thereon may be readily withdrawn through the passageway 15 and thereby detached from the coupling.

On flowing water from the passage 15 downwardly into the screen A and outwardly through the slots *i* into the tank 18 the screen serves to screen out and collect therein such solid particles as may be contained in the water of such size as not to be passable through the slots *i*. Such solid particles will collect in the screen and may be removed therefrom on demounting the latter. However such flow of water acts to spread the elements 5 apart in opposition to the thrust of the grommet 11 to thereby increase the width of the slots *i* so as to free such solid particles as may have become lodged in the outer marginal portion of the slots and thus clear the latter.

On directing the flow of the liquid content of the tank to discharge inwardly through the screen A, as in flowing reconditioning brine and back-wash water from the tank to discharge through the passage 15, such liquid will enter the slots *i* and pass to the interior of the screen and thence flow upwardly through the ring 7 to discharge through the passage 15.

The screen A will then act to prevent the passage therethrough of granular solids of dimensions incapable of passing through the slots *i* from the exterior thereof. The major portion of such solids as may be brought into contact with the outer surface portions of the screen will sooner or later fall from the latter and return to the bed thereof in the tank particularly on termination of the discharge of the liquid through the screen from the exterior thereof. As before stated, such solids as may cling to the exterior of the screen A will be flushed therefrom on directing the flow of the water from the interior to the exterior of the screen. This flushing action is facilitated by reason of the adjacent elements 5 being slightly movable laterally in relation to each other. Usually the elements 5 will be aligned in the applied stack thereof under the action of the water flow through the slots *i* being normally equal throughout the margins of the slots. However in event adjacent elements are out of peripheral alignment the distance between the outer margins of the slot and the inner margin of an adjacent element will be greater on one marginal position of the element than on the opposite portion thereof thereby setting up a differential in resistance resulting in an increased thrust on the laterally extended portion of the element such as to retract the extended portion until the thrusts on the element are equalized throughout its perimeter. In event solid particles clog the exterior of the slot *i* during back flow of water through the screen resistance to flow water through the slot will be established whereby the element 5 on opposite sides of the slot will be thrust inwardly a short distance. In this fashion a number of the elements 5 may be disposed out of alignment. But when the direction of fluid flow is reversed, the clogging particles will momentarily prevent the flow of fluid through the obstructed portion of the slot until the thrust of reactive pressures acts either to directly dislodge the particles or to shift the effected elements laterally and at the same time spread them apart to widen the slot *i* thus freeing the clogging particles from the slot *i*.

The several parts of the recited structure, other than the resilient grommet and sealing rings, may be formed of any suitable material; but while being subject to being made of metal, are preferably formed of an organic plastic which is resistant to acid and alkali.

A particularly advantageous feature is the provision of circumferential screening slots which are open and unobstructed throughout their lengths of 360° whereby maximum open capacity of the slots is attained throughout the perimeter of the screen.

By the construction set forth a screen is provided which is adapted to be readily varied in its capacity by adding or subtracting the screen elements 5. The recited construction is further advantageous in that it is compact and affords a relatively large capacity for a given size and is such that it may be easily taken apart and reassembled if need be for cleaning and repairs.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. A screen for the purpose set forth comprising a multiple of complementary annular screen elements loosely assembled in a stack in substantially axial alignment, spacing studs on said elements arranged to abut adjacent elements to space the elements apart and thereby form open passages therebetween, and means for holding said elements in the stack with adjacent elements in laterally slidable relation to each other comprising pins on one of adjacent elements projecting interiorly of the other adjacent element in spaced relation to the inner periphery of the latter.

2. In a screen for the purpose specified, a stack of annular screening elements each of which comprises a flat ring having a marginal flange formed with an inwardly inclined outer margin and an outwardly inclined inner margin, spacing studs on said ring apart from said flange adapted to abut an adjacent element to space said elements apart, pins on the inner periphery of said ring adapted to extend interiorly of an adjacent element contiguous the inner periphery thereof in spaced relation thereto; and means engageable with the ends of said stack of elements yieldably clamping said elements together for separating movement relative to each other.

3. The combination with a tank having a passage for the intake and discharge of liquid, a stem carried by said tank projecting thereinto from said passage, a multiple of annular screen elements arranged in a loose stack and carried on said stem with one end of the stack disposed in said passage and the other end thereof extending into said tank, adjacent of said elements being spaced apart relative to each other forming slots therebetween, means sealing the outer periphery of one end of said stack relative to said passage, means yieldably clamping the elements together collectively whereby adjacent elements may be spread apart to widen the slots therebetween under pressure of liquid flowing through said slots, and guide pins on each of said elements projecting interiorly of an adjacent element in spaced relation to the inner periphery thereof whereby adjacent elements may move laterally relative to each other.

4. In a screen for the purpose specified embodying a series of annular screening elements arranged in a stack; said elements each comprising a flat ring having a narrow outer marginal flange on one side thereof, spacing studs on said side of said ring spaced inwardly from said flange having a diameter approximating the width of said flange and a height slightly exceeding that of said flange adapted to abut an adjacent element to space said elements apart, a series of axially extending pins on the inner periphery of said ring adapted to extend interiorly of an adjacent element contiguous but in spaced relation thereto; and means loosely clamping said elements together for relative movement laterally and axially thereof.

5. A screen comprising a plurality of identical annular elements stacked one above the other wherein each element comprises a ring have opposed flat faces and having a narrow peripherial flange projecting from one of said flat faces at the outer margin thereof together with a plurality of spacing studs on one of said flat faces; a series of spaced bosses projecting radially inward from the inner margin of said ring, and a tapered pin projecting from each of said bosses axially of said ring for projecting alongside the inner periphery of an adjacent ring.

References Cited in the file of this patent

UNITED STATES PATENTS

| | | |
|---|---|---|
| 1,694,332 | McGill | Dec. 4, 1928 |
| 1,992,101 | Stuart | Feb. 19, 1935 |
| 2,137,556 | Young | Nov. 22, 1938 |
| 2,330,945 | Becker | Oct. 5, 1943 |
| 2,699,261 | Britton et al. | Jan. 11, 1955 |
| 2,743,016 | Pick | Apr. 24, 1956 |

FOREIGN PATENTS

| | | |
|---|---|---|
| 158,827 | Austria | May 25, 1940 |
| 461,162 | Germany | June 13, 1928 |
| 907,166 | Germany | Mar. 22, 1954 |